(12) United States Patent
Liu et al.

(10) Patent No.: US 10,818,195 B2
(45) Date of Patent: Oct. 27, 2020

(54) LEARNING METHOD AND SYSTEM

(71) Applicant: National Taiwan Normal University, Taipei (TW)

(72) Inventors: Tzu-Chien Liu, Taipei (TW); Chao-Ling Chen, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 260 days.

(21) Appl. No.: 15/991,167

(22) Filed: May 29, 2018

(65) Prior Publication Data

US 2018/0350256 A1 Dec. 6, 2018

(30) Foreign Application Priority Data

Jun. 2, 2017 (TW) .............................. 106118245 A

(51) Int. Cl.
| | |
|---|---|
| *G06F 3/0481* | (2013.01) |
| *G09B 7/07* | (2006.01) |
| *G06F 3/0484* | (2013.01) |
| *G09B 7/02* | (2006.01) |
| *G06F 3/0488* | (2013.01) |
| *G09B 5/00* | (2006.01) |
| *H04W 4/80* | (2018.01) |

(52) U.S. Cl.
CPC .............. *G09B 7/07* (2013.01); *G06F 3/0488* (2013.01); *G06F 3/04815* (2013.01); *G06F 3/04845* (2013.01); *G09B 5/00* (2013.01); *G09B 7/02* (2013.01); *H04W 4/80* (2018.02)

(58) Field of Classification Search
CPC .... G09B 7/07; G09B 5/00; G09B 7/02; G06F 3/04815; G06F 3/04845; G06F 3/0488; H04W 4/80
USPC ........................................................ 434/322
See application file for complete search history.

(56) References Cited

U.S. PATENT DOCUMENTS

| | | | | |
|---|---|---|---|---|
| 2015/0338674 | A1* | 11/2015 | Cornford | ............... G02B 30/56 |
| | | | | 359/479 |
| 2016/0196765 | A1* | 7/2016 | Stauch | ................... G09B 19/00 |
| | | | | 434/236 |

* cited by examiner

*Primary Examiner* — Michael C Grant
(74) *Attorney, Agent, or Firm* — Birch, Stewart, Kolasch & Birch, LLP

(57) ABSTRACT

A learning method to be implemented by an electronic device including a processor and a display unit and cooperating with an imaging frame includes: storing a set of image data related to a virtual 3D image of an object, and a total score associated with the object; displaying, by the display unit, image parts respectively on display areas that surround a central area according to the set of image data, in a manner that the virtual 3D image of the object is reconstructed in the imaging frame when the imaging frame is placed on the display unit and corresponds to the central area in position; determining, by the processor, whether a time duration for which the display unit displays the image parts is not smaller than a predetermined time duration; and when affirmative, adding, by the processor, a learning score to the total score.

16 Claims, 19 Drawing Sheets

LEARNING METHOD AND SYSTEM

CROSS-REFERENCE TO RELATED APPLICATION

This application claims priority to Taiwanese Patent Application No. 106118245 filed on Jun. 2, 2017.

FIELD

The disclosure relates to a learning method and a learning system, more particularly to a learning method and a learning system involving a virtual 3D image.

BACKGROUND

Two dimensional imaging technology is widely used in electronic devices having a display screen nowadays. In order to provide a more interesting experience for users, to generate/reconstruct a virtual three-dimensional (3D) image by an electronic device has been developed. It is worth working on the subject of involving 3D image reconstruction in learning.

SUMMARY

Therefore, an object of the present disclosure is to provide a method and system for encouraging users to learn.

According to one aspect of the present disclosure, a learning method is provided. The learning method is to be implemented by an electronic device cooperating with an imaging frame. The electronic device includes a processor and a display unit. The method includes:

storing a set of image data that is related to a virtual three-dimensional (3D) image of a target object, and a total score that is associated with the target object;

displaying, by the display unit, a plurality of image parts respectively on a plurality of display areas that surround a central area according to the set of image data, in a manner that the virtual 3D image of the target object is reconstructed in the imaging frame when the imaging frame is placed on the display unit and corresponds to the central area in position;

determining, by the processor, whether a time duration for which the display unit displays the image parts for reconstructing the virtual 3D image is not smaller than a predetermined time duration; and when it is determined that the time duration is not smaller than the predetermined time duration, adding, by the processor, a learning score to the total score.

According to another aspect of the disclosure, a learning system is provided. The learning system includes an electronic device and an imaging frame. The electronic device includes a storage unit, a display unit and a processor. The storage unit stores a set of image data related to a virtual three-dimensional (3D) image of a target object, and a total score associated with the target object. The display unit is configured to display, according to the set of image data, a plurality of image parts respectively on a plurality of display areas surrounding a central area. The processor is configured to determine whether a time duration for which the display unit displays the image parts is not smaller than a predetermined time duration, and to add a learning score to the total score when determining that the time duration is not smaller than the predetermined time duration. The imaging frame includes a plurality of transparent plates that are interconnected to define an inner space. The imaging frame has a shape substantially of a frusto-pyramid and a polygonal end. When the imaging frame is placed on a surface of the display unit with the polygonal end corresponding to the central area in position, an included angle between the surface and each of the transparent plates is a substantially identical acute angle, and the virtual 3D image of the target object is reconstructed in the inner space by refracting the image parts through the transparent plates, respectively.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Figure 1:
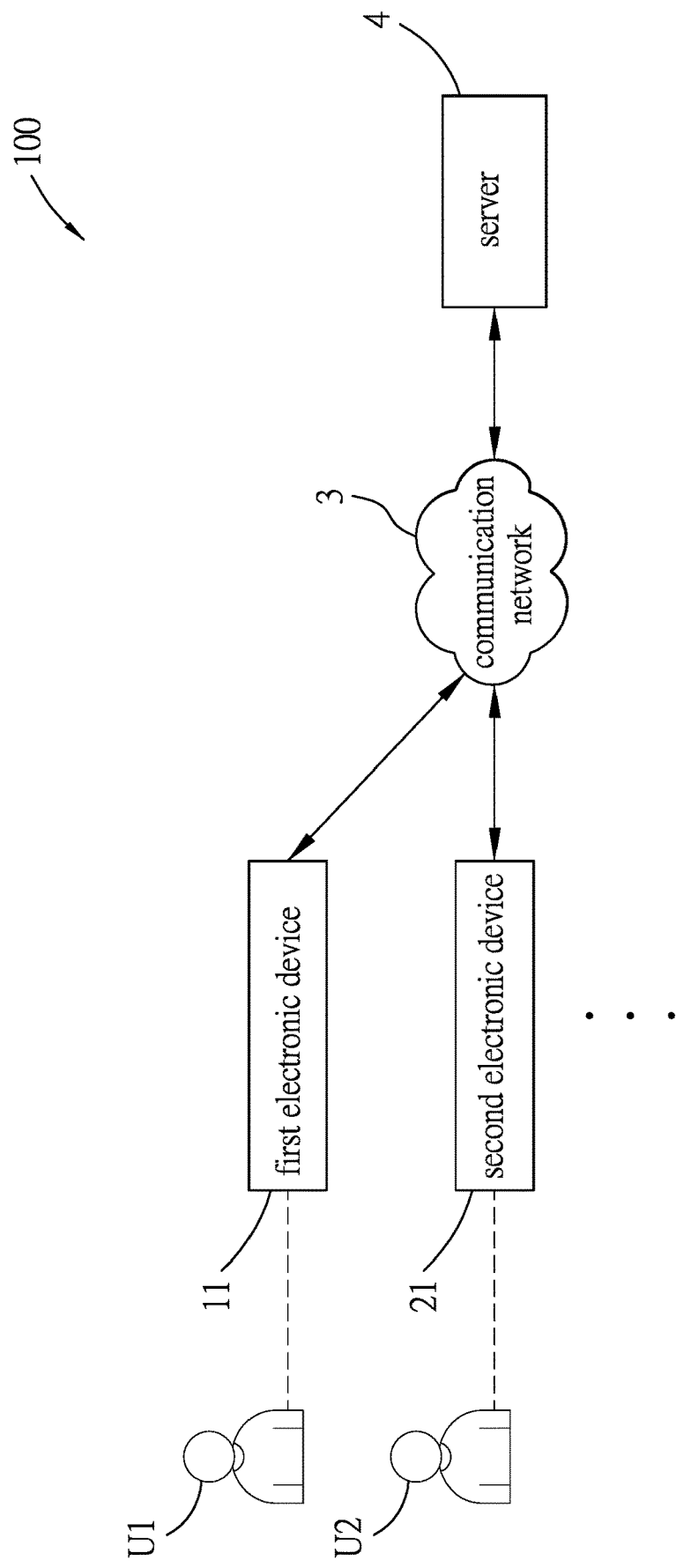
FIG. 1 is a schematic diagram of a learning system according to one embodiment of the present disclosure.
Figure 2:
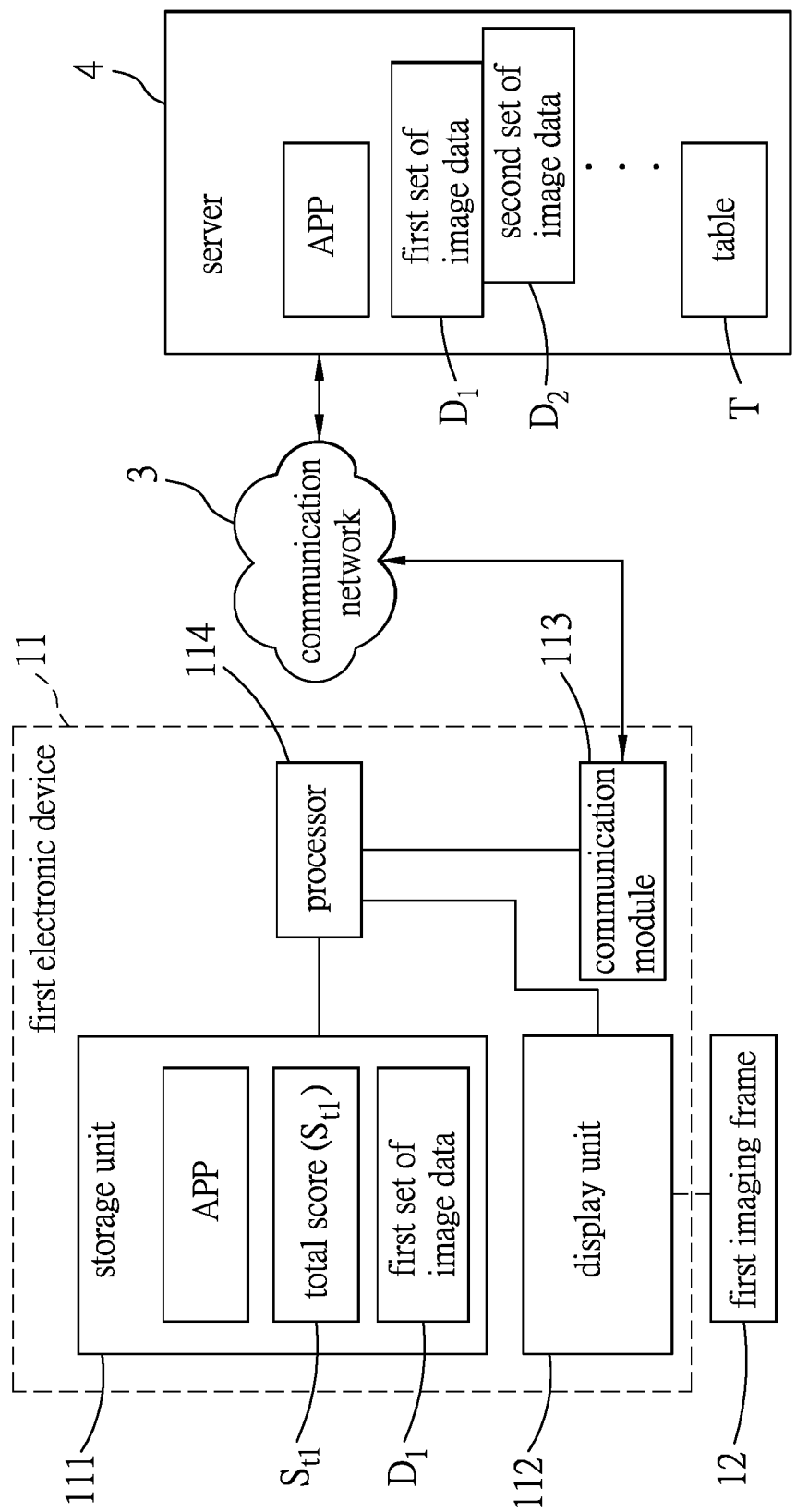
FIG. 2 is a block diagram illustrating a first electronic device of the learning system communicating with a server according to one embodiment.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 to 4 and FIG. 11, a learning system 100 according to one embodiment of the present disclosure includes a first electronic device 11, a first imaging frame 12, a second electronic device 21, a second imaging frame 22 and a server 4. In this embodiment, the first and second electronic devices 11, 21 are two smart phones and can each be implemented by other electronic devices such as a laptop, a tablet computer, a personal digital assistant (PDA), and any other electronic devices that are suitable for performing functions described herein in other embodiments of this disclosure. Note that, in one embodiment, the second electronic device 21 is similar to the first electronic device 11 and the second imaging frame 22 is similar to the first imaging frame 12. As long as the number of the electronic devices is identical to the number of the imaging frames, the number of the electronic devices or the number of the imaging frames is not limited to two and the present disclosure is not limited in this respect. Note that, although the first and second electronic devices 11, 21 are both illustrated as a smart phone in the drawings, they may be embodied by different types of electronic devices in other embodiments, e.g., a smart phone for the first electronic device 11 and a tablet computer for the second electronic device 12.

Before a learning method is implemented by the learning system 100, the first electronic device 11 downloads from the server 4 an application program (App) that serves as a user interface for a first user (U1) of the first electronic device 11. In one embodiment of this disclosure, the first electronic device 11 communicates with the server 4 over a communication network 3 (e.g., a mobile communication network), and includes a storage unit 111 for storing the application program (App), a display unit 112, a communicating module 113 and a processor 114. The first imaging frame 12 has a shape substantially of a frusto-pyramid, and includes a plurality of transparent plates 121 that are interconnected to define a first inner space 122. The first imaging frame 12 has a polygonal end 124 (i.e., a lower end shown in FIG. 3.) Each of the light transmissive plates 121 defines a substantially identical included angle, e.g., 45 degrees, with a surface 1121 of the display unit 112 when the first imaging frame 12 is placed on the surface 1121 of the display unit 112 with the second polygonal end 124 in contact with the surface 1121, and the included angle is not limited to this example.

For example, the storage unit 111 may include any non-transitory memory mechanism, such as read-only memory (ROM), random-access memory (RAM), magnetic disk storage media, optical storage media, flash memory, solid state devices (SSD), and other storage devices and media. The display unit 112 is a touch screen display. The communicating module 113 may include a short-range wireless communicating module supporting a short-range wireless communication network using a wireless technology of Bluetooth® and/or Wi-Fi, etc., and a mobile communicating module supporting telecommunication using Long-Term Evolution (LTE), the third generation (3G) and/or fourth generation (4G) of wireless mobile telecommunications technology, and/or the like. The term "processor" may refer to any device or portion of a device that processes electronic data from registers and/or memory to transform that electronic data into other electronic data. For example, the processor 114 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

Figure 4:
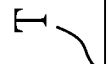
FIG. 4 is a table storing an association relationship between the first electronic device and a first data code.

The server 4 stores a plurality of sets of image data including at least a first set of image data ($D_1$) related to a virtual three-dimensional (3D) image of a first target object and a second set of image data ($D_2$) related to a virtual 3D image of a second target object, and a plurality of data codes including at least a first data code ($C_1$) assigned to the first set of image data ($D_1$) and a second data code ($C_2$) assigned to the second set of image data ($D_2$). When the learning system 100 implements the learning method in a general learning mode, only the first electronic device 11 and the server 4 are involved. In the general learning mode of the learning method, the first electronic device 11 first sends a request signal to the server 4 to ask for the first set of image data ($D_1$). The request signal includes a first device identification (ID) code ($I_1$) that is used to identify the first electronic device 11. Then, the server 4 transmits the first set of image data ($D_1$) to the first electronic device 11 in response to receipt of the request signal from the first electronic device 11. Further, in response to receipt of the request signal from the first electronic device 11, the server 4 associates the first device ID code ($I_1$) received from the first electronic device 11 with the first data code ($C_1$) assigned to the first set of image data ($D_1$) that corresponds to the request signal and that is transmitted to the first electronic device 11, and stores association relationship between the first device ID code ($I_1$) and the first data code ($C_1$). In particular, the server 4 stores the association relationship between the first device ID code ($I_1$) and the first data code ($C_1$) in a form of a table (T) as shown in FIG. 4. The storage unit 111 of the first electronic device 11 stores the first set of image data ($D_1$) and a total score ($S_{t1}$) associated with the first target object upon receipt of the first set of image data ($D_1$).

Figure 3:
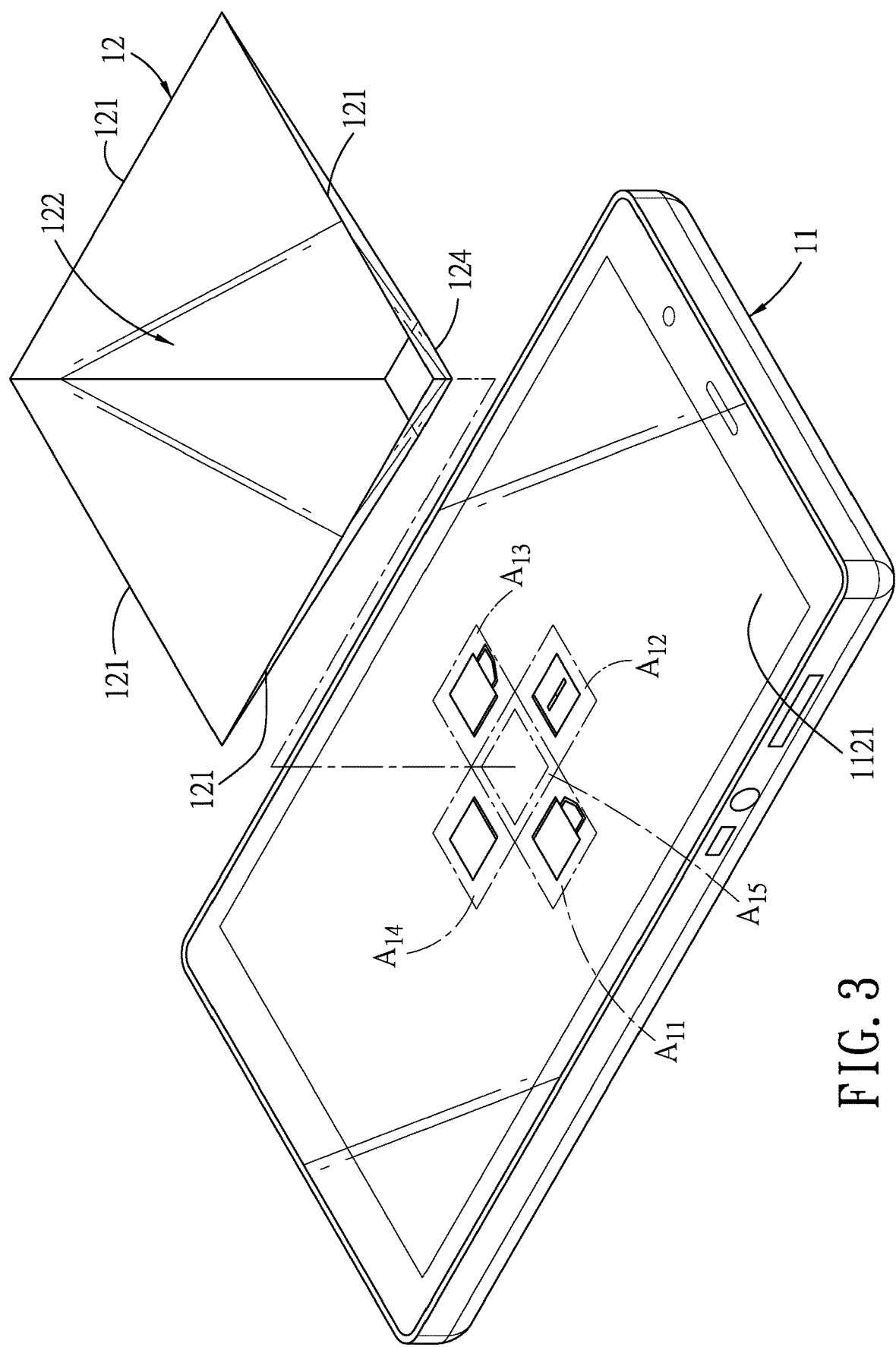
FIG. 3 is a schematic perspective view of the first electronic device and a first imaging frame according to one embodiment of the present disclosure.
Figure 5:
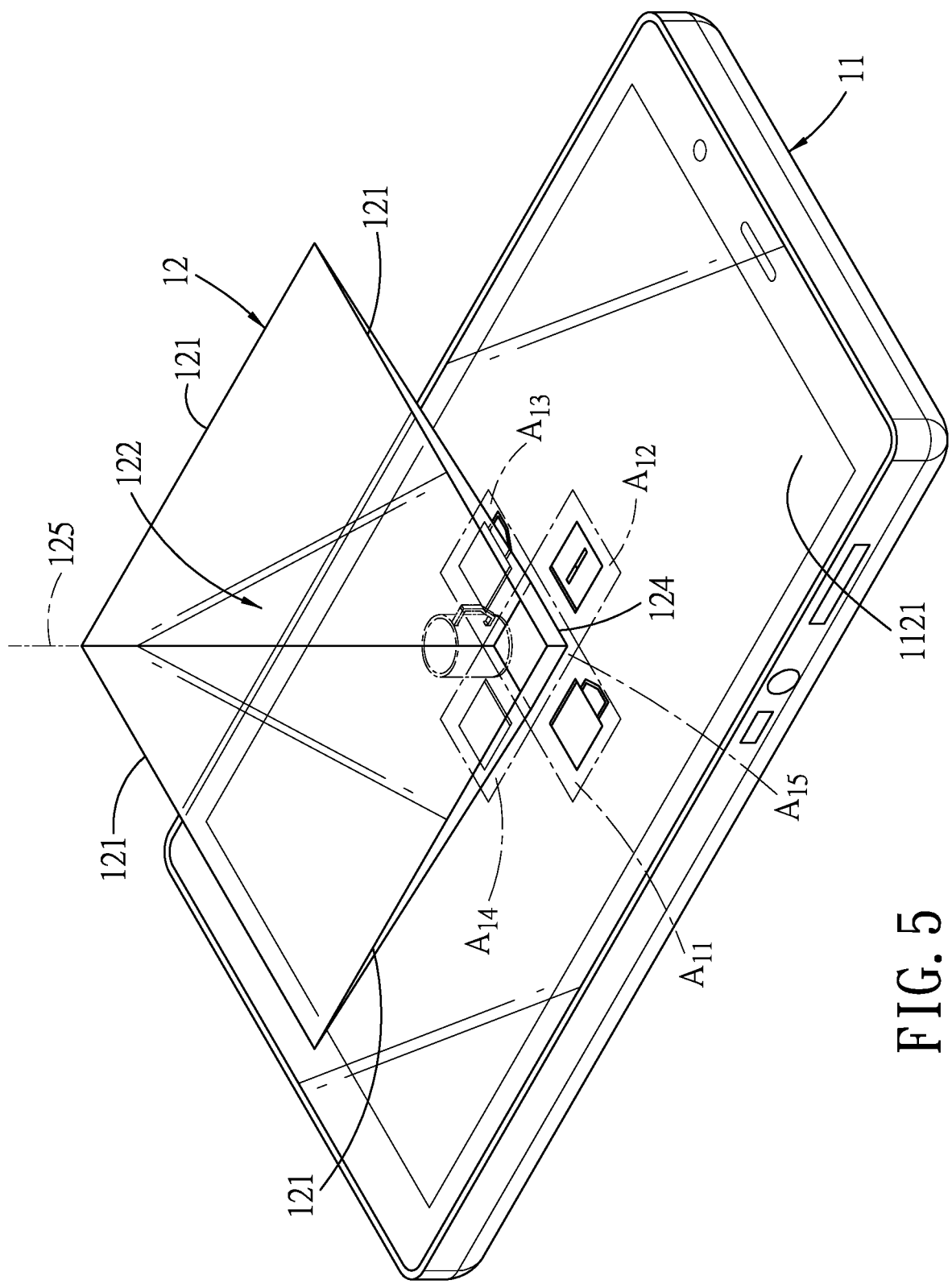
FIG. 5 is a schematic perspective view illustrating the first electronic device cooperating with the first imaging frame to reconstruct a virtual 3D image of a first target object.

As shown in FIG. 3, the display unit 112 displays a plurality of first image parts respectively on a plurality of first display areas ($A_{11}$-$A_{14}$) that surround a first central area ($A_{15}$) according to the first set of image data ($D_1$). By virtue of the first display areas ($A_{11}$-$A_{14}$) displaying the first image parts and surrounding the first central area ($A_{15}$), when the first imaging frame 12 is placed on the surface 1121 of the display unit 112 with the second polygonal end 124 in contact with the surface 1121 and registered with the first central area ($A_{15}$) in position, the virtual 3D image of the first target object (e.g., a cup in FIG. 5) is reconstructed in the first inner space 122. Specifically, light from the four first image parts displayed respectively on the first display areas ($A_{11}$-$A_{14}$) refract respectively through the four transparent plates 121 of the first imaging frame 12 to reconstruct the virtual 3D image in the first inner space 122. The virtual 3D image may be a dynamic image and may contain information of the first target object, such as description relating to the first target object in multiple languages. By this way, the user (U1) of the first electronic device 11 can watch and learn knowledge associated with the first target object as depicted in FIG. 5. Note that a number of the first image parts is identical to a number of the transparent plates 121 of the first imaging frame 12 and the present disclosure is not limited in this respect.

Upon displaying the first image parts by the display unit 112, the processor 114 determines whether a time duration for which the display unit 112 displays the first image parts is not smaller than a predetermined time duration, and adds a learning score to the total score ($S_{t1}$) when determining that the time duration is not smaller than the predetermined time duration. Note that in this embodiment, the processor 114 sets an initial value of the total score ($S_{t1}$) to zero when the first set of image data ($D_1$) is received. For example, the learning score is set as ten, and the predetermined time duration is ten minutes. In response to determining that the display unit 112 continues to display the first image parts for more than ten minutes, the processor 114 adds the learning score, i.e., ten, to the total score, i.e., zero, so the total score ($S_{t1}$) is now equal to ten.

Figure 6:
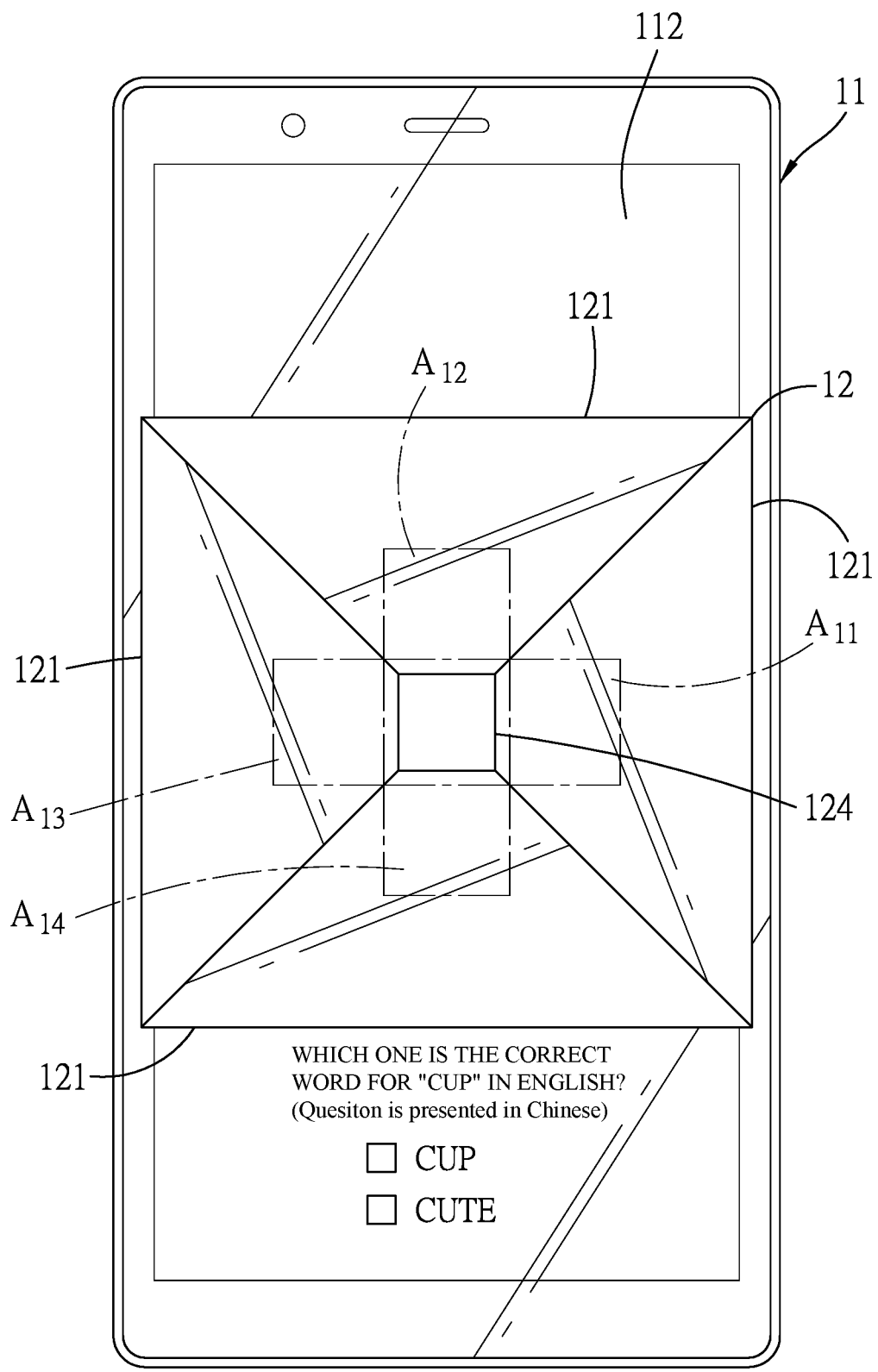
FIG. 6 is a schematic view illustrating the first electronic device displaying a question related to the first target object.

Further referring to FIG. 6, the processor 114 further controls the display unit 112 to output a question related to the first target object. The question related to the first target object can be an essay question, a multiple-choice test, a true/false test, etc. The processor 114 further determines whether a user answer is correct upon receipt of the user answer, and adds an answering score to the total score ($S_{t1}$) when determining that the user answer is correct. In one embodiment, the answering score is set as fifty and the present disclosure is not limited to this example. In the example shown in FIG. 6, the question is a multiple-choice test and the display unit 112 further displays, as controlled by the processor 114, a plurality of choices, among which one is correct and related to the first target object. In this example, the question asks the user in Chinese to select a correct English word for cup, and the options includes "CUP" and "CUTE". When the user selects "CUP" as the user answer, which is correct, the processor 114 adds the answering score, e.g., fifty, to the total score ($S_{t1}$), so the total score ($S_{t1}$) is equal to sixty (ten plus fifty). In one embodiment of this disclosure, the display unit 112 outputs, e.g., by displaying "CORRECT" and the total score ($S_{t1}$) thereon to notify the user (U1) that the user answer is correct and that the total score ($S_{t1}$) has increased. By doing so, the user (U1) of the first electronic device 11 would be encouraged to concentrate his/her attention on the virtual 3D image of the first target object, and the total score ($S_{t1}$) may serve as an evaluation standard of the learning result regarding the first target object for the user (U1).

Figure 7:
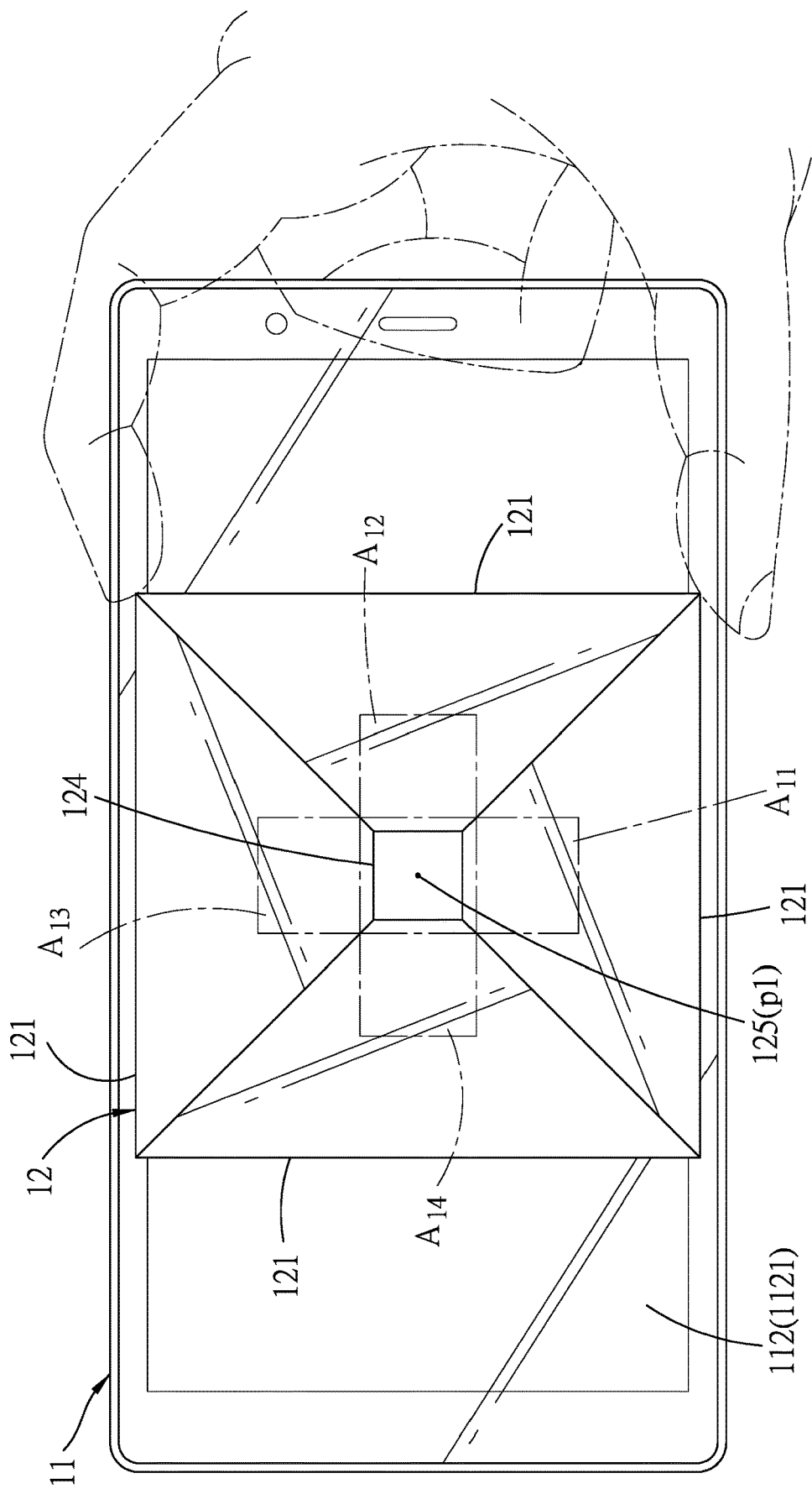
FIGS. 7 to 9 are schematic top views of the first imaging frame being moved on the first electronic device and corresponding changes made by the first electronic device.
Figure 8:
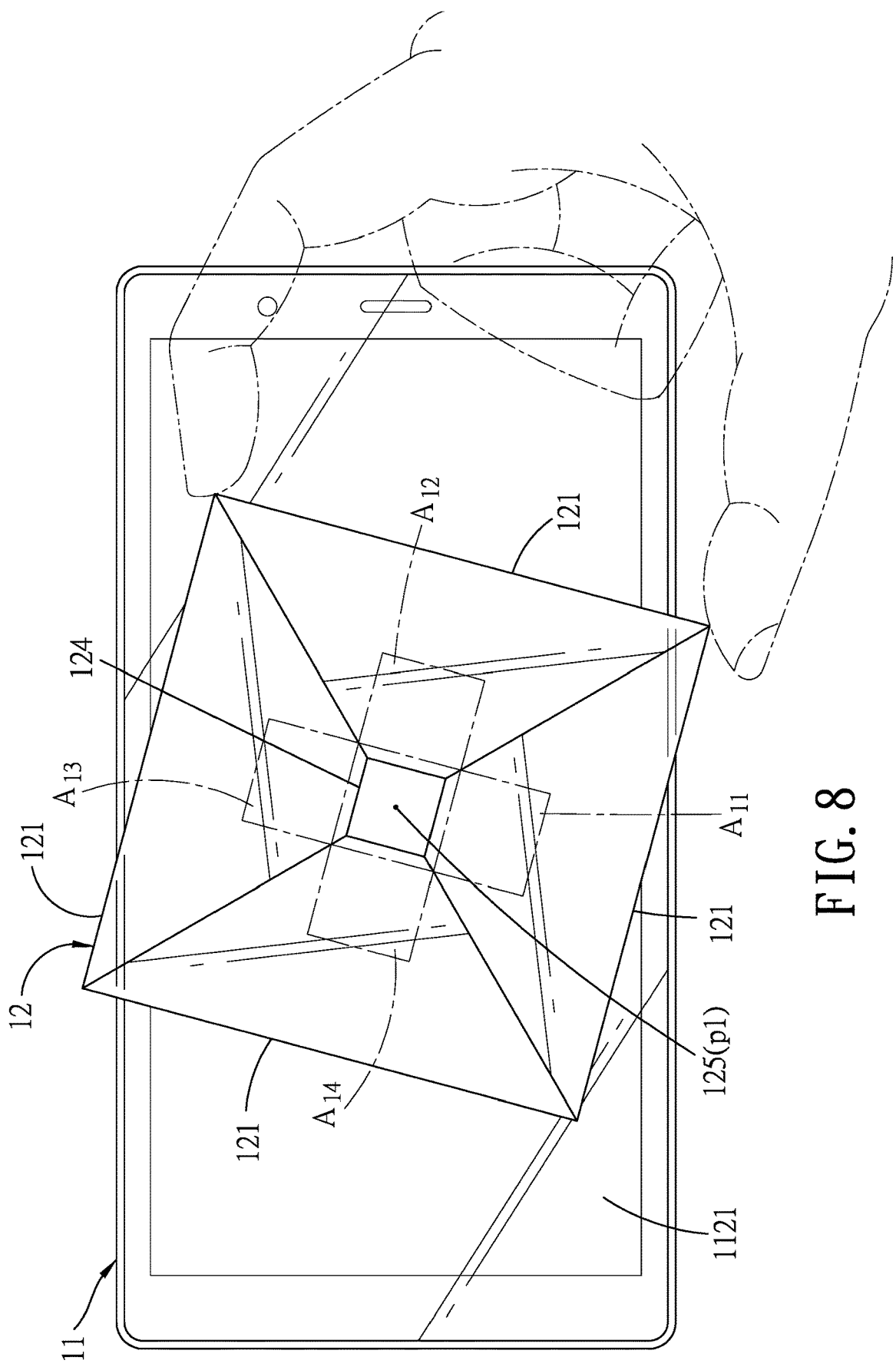
Figure 9:
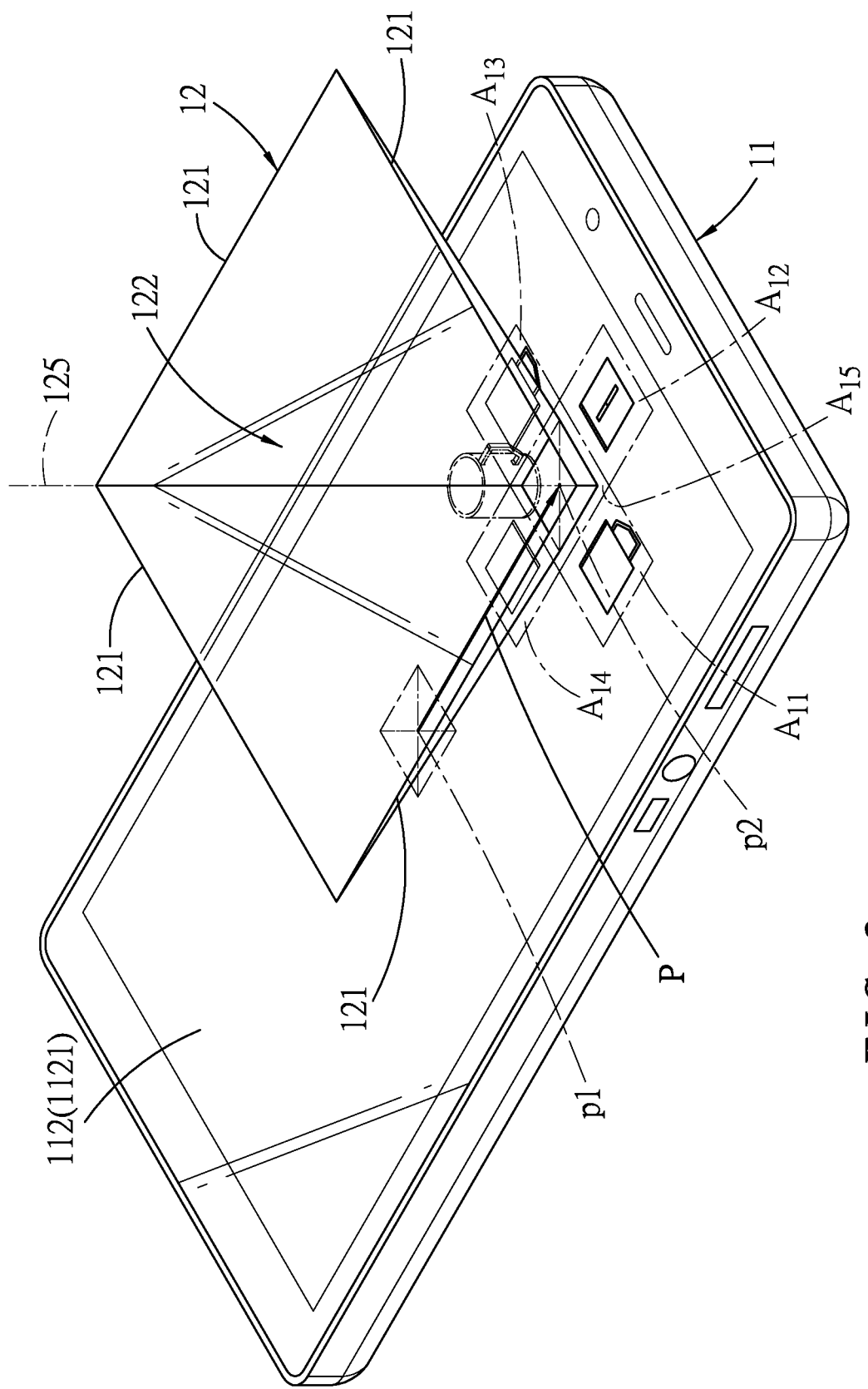

Further referring to FIGS. 7 to 9, in one embodiment, the transparent plates 121 of the first imaging frame 12 are coated with a conductive film (not shown) thereon, and the display unit 112 is a touch screen display configured to detect movement of the first imaging frame 12 on the surface 1121 thereof and to transmit a touch signal to the processor 14 upon detecting movement of the first imaging frame 12. The processor 14 further adds an additional score to the total score ($S_{t1}$) upon the display unit 112 detecting movement of the first imaging frame 12 on the surface 1121 of the display unit 112. Note that in this embodiment, the additional score is set as forty, and the present disclosure is not limited to this example. Specifically, the display unit 112 is capable of detecting movement of the first imaging frame 12 on the surface 1121 by detecting rotation of the first imagining frame 12 around a central axis 125 thereof that is perpendicular to the surface 1121 of the display unit 112 and/or translation of the first imaging frame 12 on the surface 1121 of the display unit 112. For example, FIG. 7 shows that the first imaging frame 12 can be moved by a user and is originally disposed at a position denoted by (p1) on the display unit 112 coinciding with the central axis 125. FIG. 8 illustrates the first imaging frame 12 being rotated in a clockwise direction about the central axis 125 on the surface 1121 of the display unit 112. FIG. 9 illustrates another example of the movement of the first imaging frame 12 that is moved to translate on the surface 1121 of the display unit 112 to a position denoted by (p2) on the surface 1121 of the display unit 112. As shown in FIG. 9, the processor 14 further controls the display unit 112 to move the first display areas ($A_{11}$-$A_{14}$) and the first central area ($A_{15}$) and the first image parts displayed on the first display areas ($A_{11}$-$A_{14}$) in accordance with the movement of the first imaging frame 12, so that the virtual 3D image of the first target object is continuously reconstructed in the first inner space 122 as the first imaging frame 12 is being moved.

Figure 10:
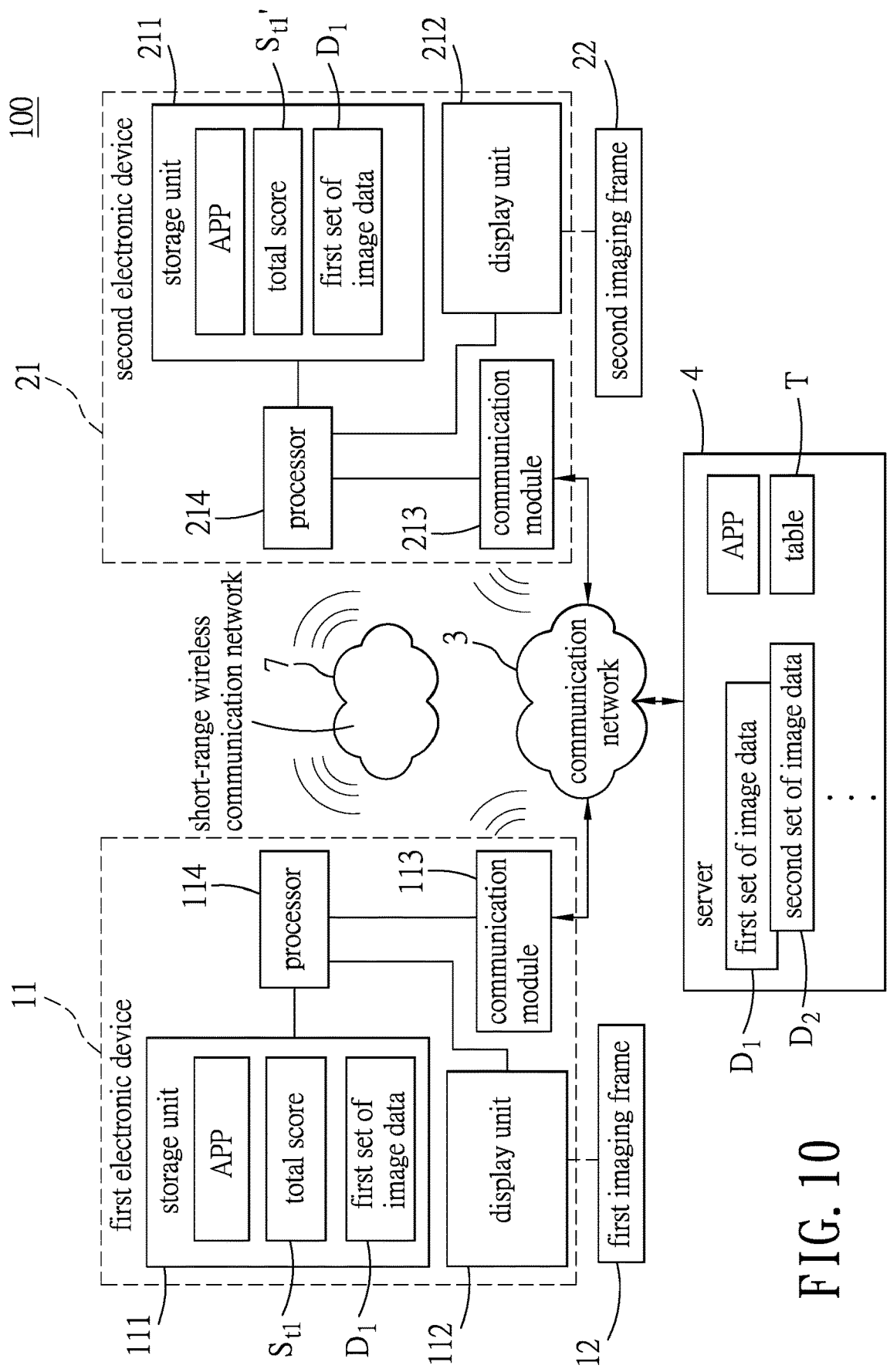
FIG. 10 is a block diagram illustrating first and second electronic devices of the learning system communicating with each other and communicating with a server when the learning system operates under a common learning mode according to one embodiment of this disclosure.
Figure 11:
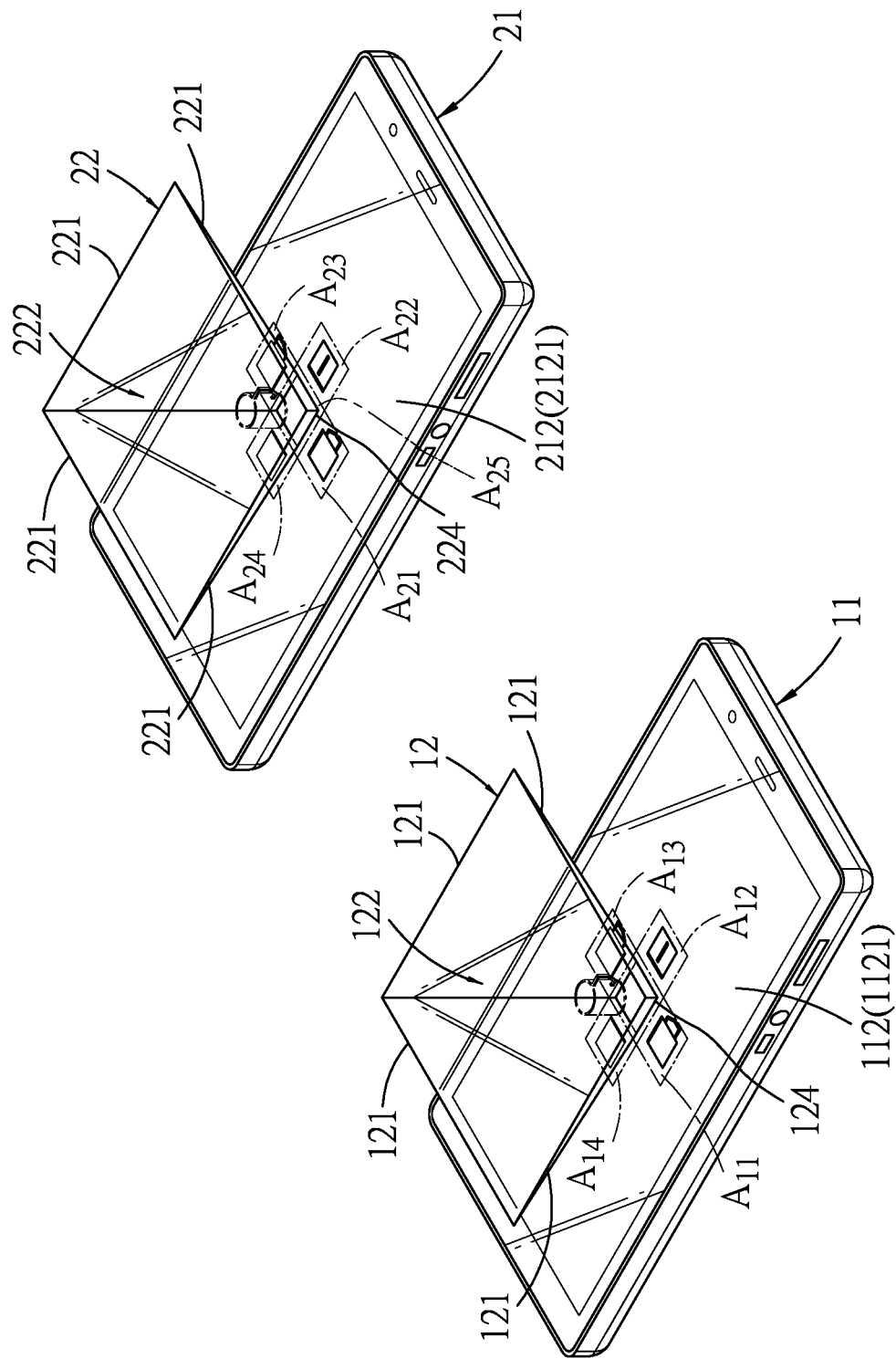
FIG. 11 is a schematic perspective view illustrating the first and second electronic devices respectively cooperating with first and second imaging frames of the learning system to form two virtual 3D images of the same first target object according to one embodiment of this disclosure.
Figure 12:
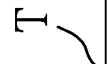
FIG. 12 is a table storing association relationship between the first electronic device and the first data code and association relationship between the second electronic device and the first data code.
Figure 13:
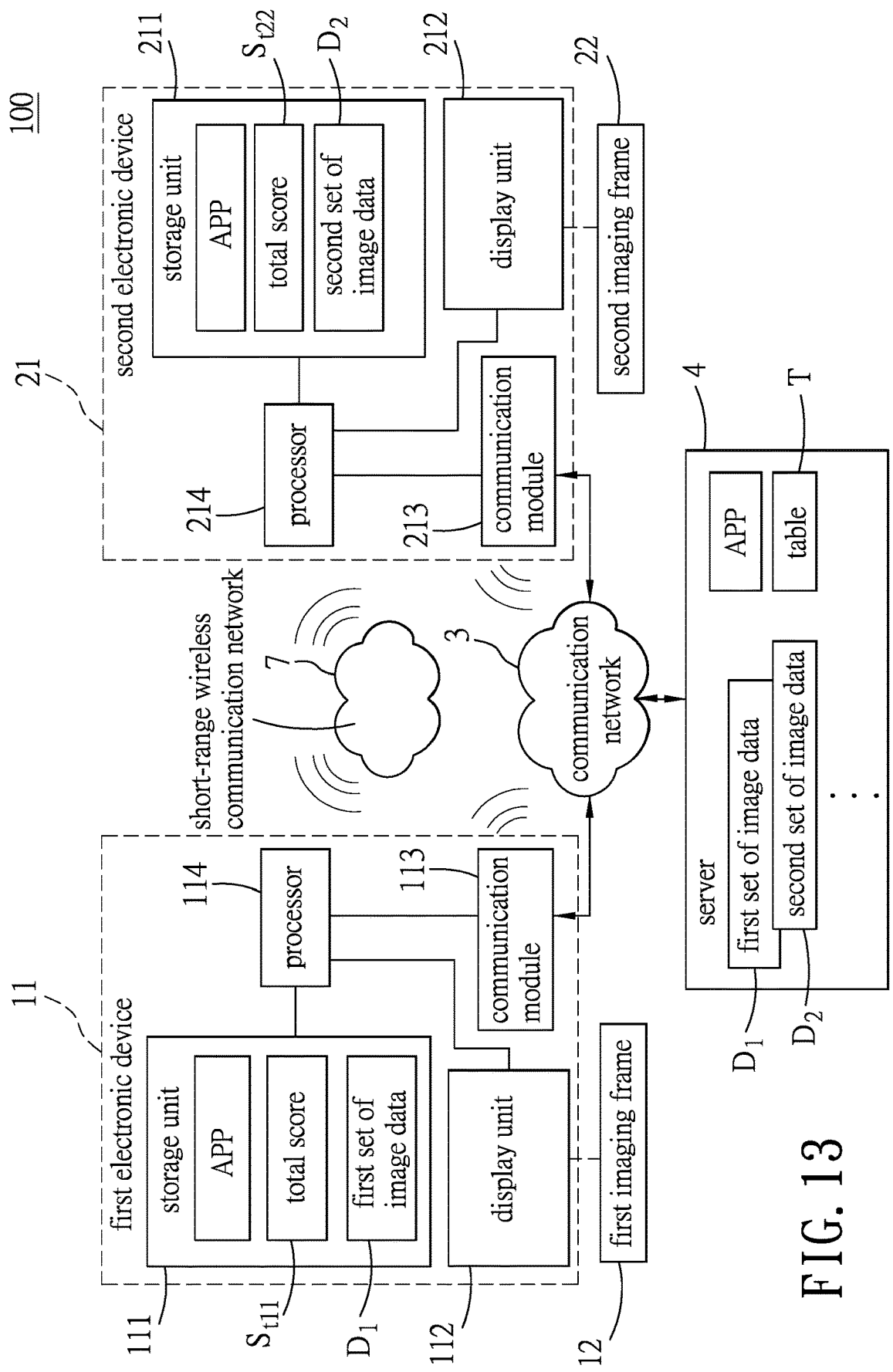
FIG. 13 is a block diagram illustrating the first and second electronic devices communicating with each other and communicating with the server when the learning system operates under an exchange mode according to one embodiment of this disclosure.
Figure 14:
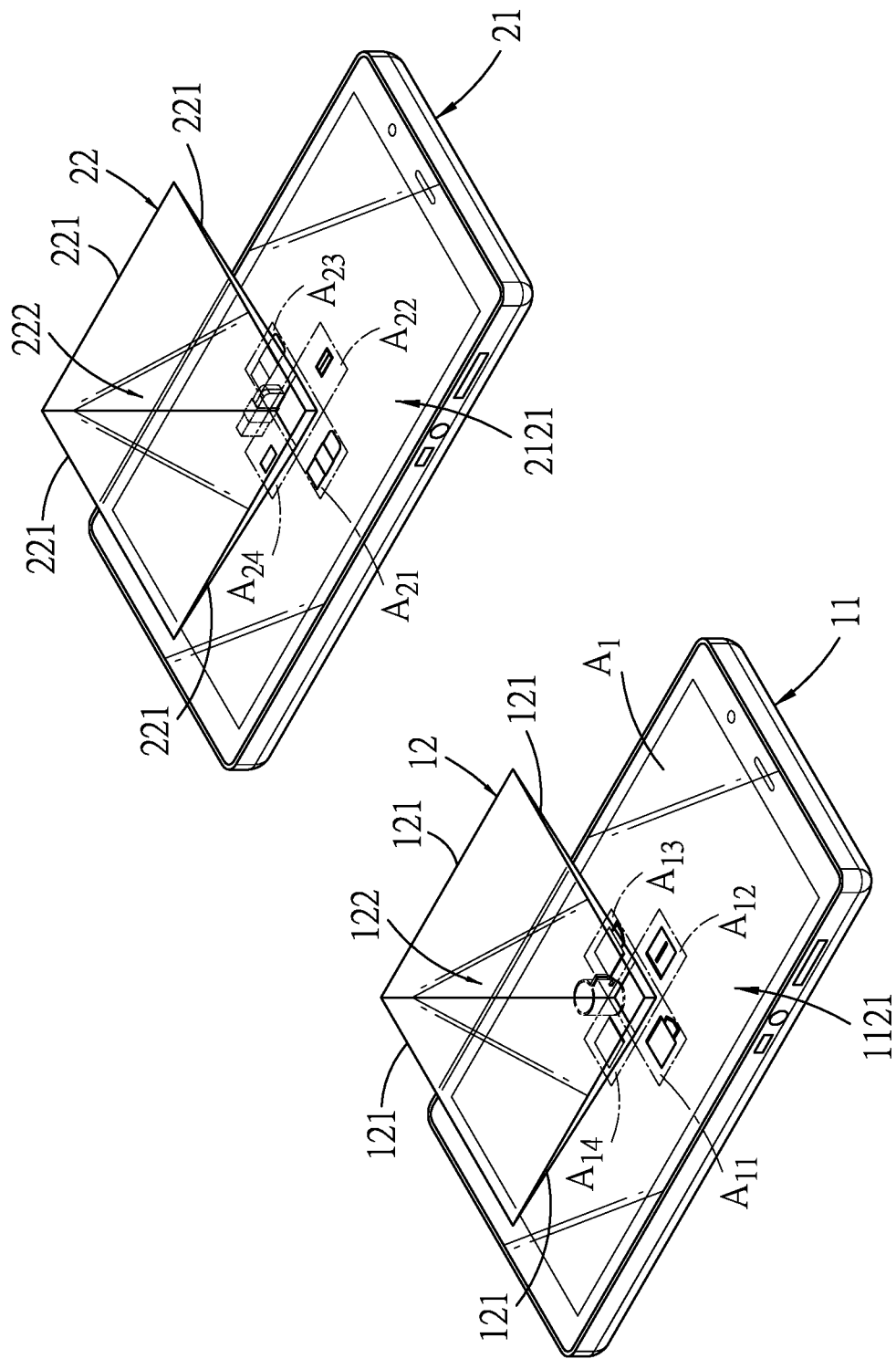
FIG. 14 is a schematic perspective view illustrating the first and second electronic devices respectively cooperating with the first and second imaging frames to respectively form two virtual 3D images of two different target objects.

Now referring to FIGS. 10 to 12, in one embodiment of this disclosure, the learning system 100 implements the learning method in a common learning mode which is substantially the same as the general learning mode except that the second electronic device 21 is also involved.

Similar to the first electronic device 11, the second electronic device 21 communicates with the server 4 over the communication network 3, and includes a storage unit 211 storing the App from the server 4, a display unit 212, a communicating module 213 and a processor 214. The components of the second electronic device 21 are similar to the corresponding components of the first electronic device 11, and details thereof will be omitted herein for the sake of brevity. The second imaging frame 22 is similar to the first imaging frame 12, has a shape substantially of a frusto-pyramid, and includes a plurality of transparent plates 221 that are interconnected to define a second inner space 222.

Similar to the first electronic device 11 and the first imaging frame 12, the display unit 212 of the second electronic device 21 displays the first image parts respectively on a plurality of second display areas ($A_{21}$-$A_{24}$) that surround a second central area ($A_{25}$) according to the first set of image data ($D_1$). Accordingly, the second electronic device 21 cooperates with the second imaging frame 22 to reconstruct a virtual 3D image of the same first target object, i.e., a cup, in the second inner space 222 of the second imaging frame 22 when the second imaging frame 22 is placed on a surface 2121 of the display unit 212 of the second electronic device 21. As shown in FIG. 12, the server 4 further associates a second device ID code ($I_2$) that is to identify the second electronic device 21 and that is received from the second electronic device 21 with the first data code ($C_1$) in response to receipt of a request signal from the second electronic device 21 asking for the first set of image data ($D_1$), and stores association relationship between the second device ID code ($I_2$) and the first data code ($C_1$) in the table (T). Since how the second electronic device 22 stores the first set of image data ($D_1$) and a total score ($S_{t1}$') and reconstructs the virtual 3D image of the first target with the second imaging frame 22 is identical to how the first electronic device 11 performs these actions, the details of the same are omitted.

Note that in this embodiment, the first and second electronic devices 11, 21 are capable of communicating with each other over a short-range wireless communication network 7 such as Bluetooth® via the communication modules 113, 213 thereof. Under the common learning mode, for the first electronic device 11, the processor 114 adds the answering score to the total score ($S_{t1}$) when determining that the user answer from the user (U1) for the question displayed on the display unit 112 is correct, and transmits the answering score to the second electronic device 11. The processor 214 of the second electronic device also adds the answering score received from the first electronic device 11 to the total score ($S_{t1}'$) stored therein upon receipt of the same. Similarly, the processor 214 of the second electronic device 21 adds the answering score to the total score ($S_{t1}'$) when determining that the user answer from the user (U2) is correct, and transmits the answering score to the first electronic device 11, such that the processor 114 of the first electronic device 11 adds the answering score to the total score ($S_{t1}$) Similar to the description related to FIG. 7, by doing so, the user (U1, U2) of each of the first and second electronic devices 11, 21 would be encouraged to concentrate his/her attention on the reconstructed virtual 3D image of the first target object, and the total score ($S_{t1}$, $S_{t1'}$) may serve as an evaluation standard of the learning result regarding the first target object for the user (U1, U2).

Figure 15:
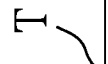
FIG. 15 is a table storing association relationship of the first and second electronic devices respectively with the first and second data code before an exchange is performed.
Figure 16:
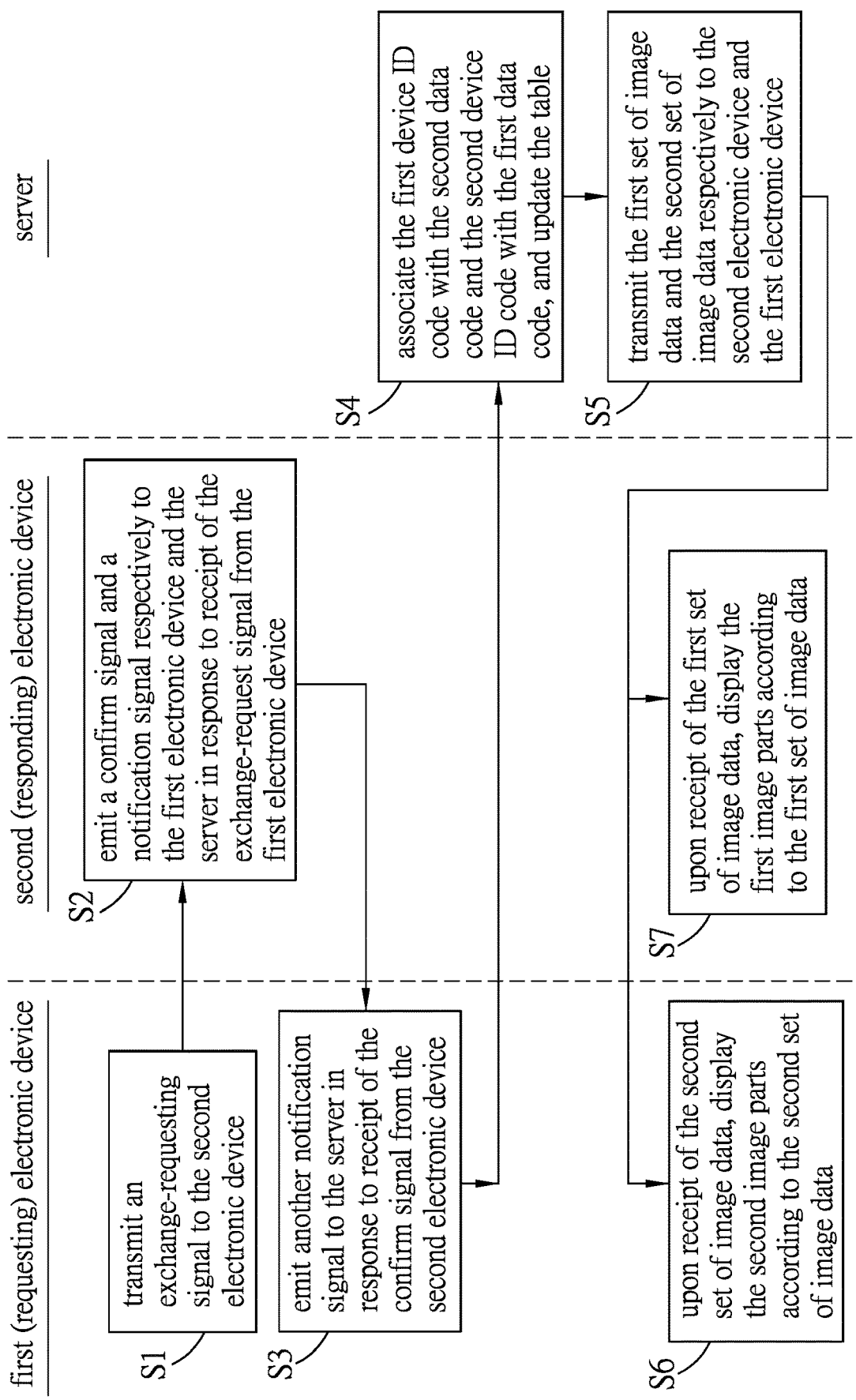
FIG. 16 is a flow chart illustrating steps of the exchange mode of the learning method according one embodiment of this disclosure.

Now referring to FIGS. 13 to 16, the learning system 100 implements the learning method in an exchange learning mode in one embodiment of the present disclosure which is described in the following. Before data exchange between the first and second electronic devices 11, 21 has started, the second electronic device 21 sends a request signal to the server 4 to ask for the second set of image data ($D_2$) while the first electronic device 11 sends a request signal to the server 4 to ask for the first set of image data ($D_1$). Similar to the abovementioned description, the first electronic device 11 cooperates with the first imaging frame 12 to reconstruct the virtual 3D image of the first target object, e.g., a cup, and stores a total score ($S_{t11}$) associated with the first target object. The display unit 212 of the second electronic device 21 displays a plurality of second image parts respectively on the second display areas ($A_{21}$-$A_{24}$) according to the second set of image data ($D_2$), so that the second electronic device 21 cooperates with the second imaging frame 22 to reconstruct a virtual 3D image of the second target object, e.g., an eraser, and stores a total score ($S_{t22}$) associated with the second target object. The server 4 associates the first device ID code ($I_1$) with the first data code ($C_1$) and the second device ID code ($I_2$) with the second data code ($C_2$), and stores the association relationship between the first device ID code ($I_1$) and the first data code ($C_1$) and the association relationship between the second device ID code ($I_2$) and the second data code ($C_2$) in the table (T) as shown in FIG. 15.

In step S1 of the exchange mode of the learning method, the first electronic device 11 transmits an exchange-requesting signal to the second electronic device 21 over the short-range communication network 7. The exchange-requesting signal includes the first device ID code ($I_1$). Note that any one of the first and second electronic devices 11, 21 can initiate the exchange learning therebetween and emit the exchange-requesting signal including the device ID code thereof to the other one of the first and second electronic devices 11, 21.

In step S2, the second electronic device 21 emits a confirm signal and a notification signal respectively to the first electronic device 11 and the server 4 in response to receipt of the exchange-requesting signal from the first electronic device 11. The notification signal includes the first device ID code ($I_1$) and the second device ID code ($I_2$), and the confirm signal includes the second device ID code ($I_2$).

In step S3, the first electronic device 11 emits another notification signal to the server 4 in response to receipt of the confirm signal from the second electronic device 21. The notification signal emitted by the first electronic device 11 also includes the first device ID code ($I_1$) and the second device ID code ($I_2$) Note that the exchange-requesting signal and the confirm signal may be generated by, e.g., shaking the first and second electronic devices 11, 21 and outputted by, e.g., an accelerometer mounted thereon, and the present disclosure is not limited in this respect. After the server 4 receives the notification signals from both the first and second electronic devices 11, 21, the flow of method goes to step S4.

Figure 18:
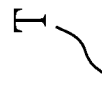
FIG. 18 is a table storing association relationship of the first and second electronic devices respectively with the second and the first data codes after the exchange is performed.

In step S4, the server 4 associates the first device ID code ($I_1$) with the second data code ($C_2$) and the second device ID code ($I_2$) with the first data code ($C_1$), and updates the table (T) by storing the association relationship between the first device ID code ($I_1$) and the second data code ($C_2$) and the association relationship between the second device ID code ($I_2$) and the first data code ($C_1$) in the table (T) as shown in FIG. 18. In some embodiments, in step S4, the server 4 further dissociates the first device ID code ($I_1$) from the first data code ($C_1$), and dissociates the second device ID code ($I_2$) from the second data code ($C_2$).

Figure 17:
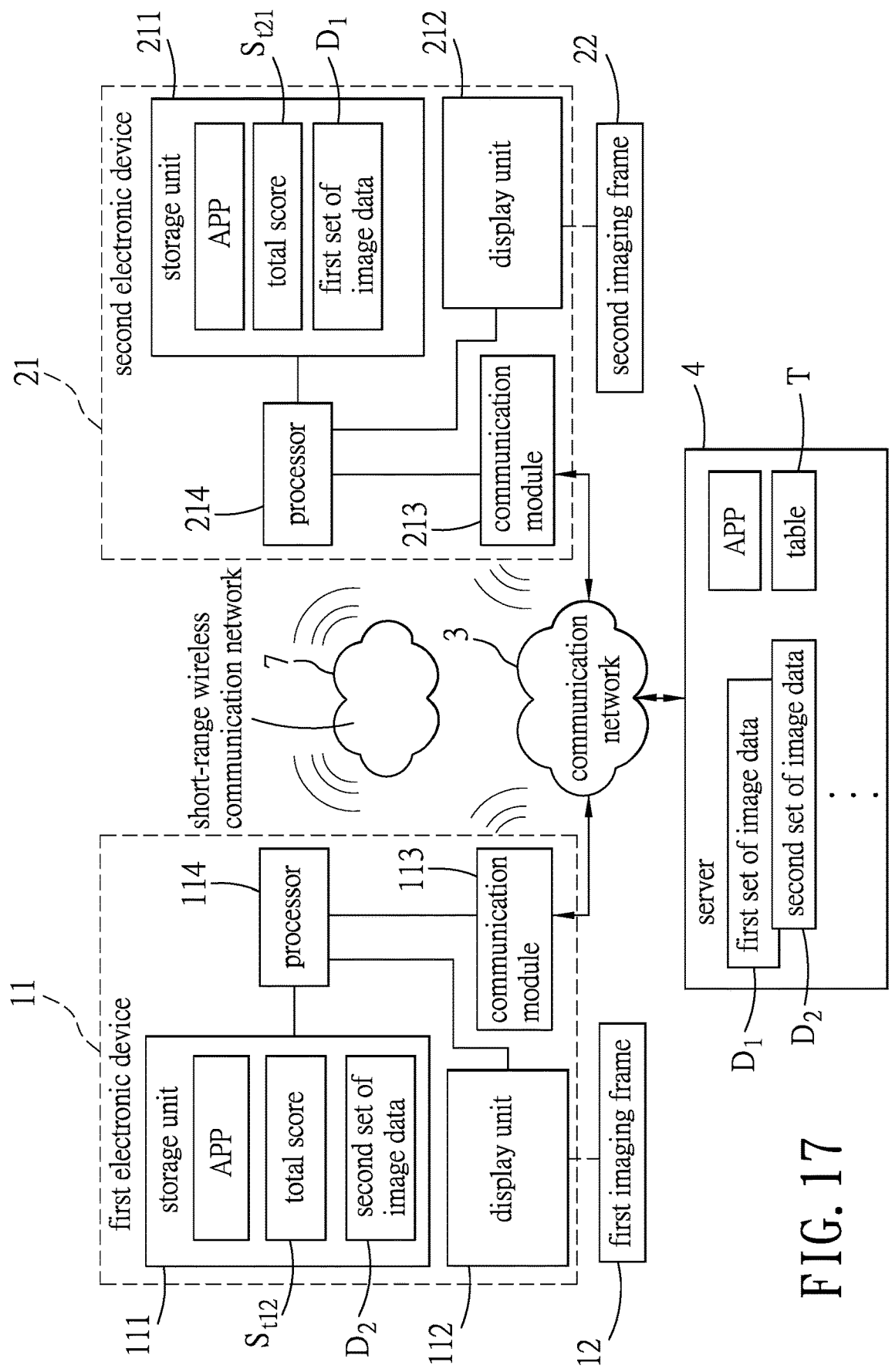
FIG. 17 is a block diagram illustrating the first and second electronic devices after the exchange is performed.

Subsequently, in step S5, the server 4 transmits the first set of image data ($D_1$) and the second set of image data ($D_2$) respectively to the second electronic device 21 and the first electronic device 11. Meanwhile, the first electronic device 11 stores the second set of image data ($D_2$) upon receipt of the same, and the second electronic device 21 stores the first set of image data ($D_1$) upon receipt of the same (see FIG. 17). In step S6, upon receipt of the second set of image data ($D_2$), the display unit 112 of the first electronic device 11 stops displaying the first image parts that are related to the virtual 3D image of the first target object, and displays the second image parts respectively on the first display areas ($A_{11}$-$A_{14}$) according to the second set of image data ($D_2$) to reconstruct the virtual 3D image of the second target object, i.e., an eraser, in the first inner space 122 of the first imaging frame 12 when the first imaging frame 12 is placed on the display unit 112 of the first electronic device 11 and corresponds to the first central area ($A_{15}$) in position. If this is the first time for the first electronic device 11 to have received the second set of image data ($D_2$), the processor 114 of the first electronic device 11 further sets an initial value of a total score ($S_{t12}$) associated with the second target object (e.g., zero) and stores the total score ($S_{t12}$) in the storage unit 111.

Figure 19:
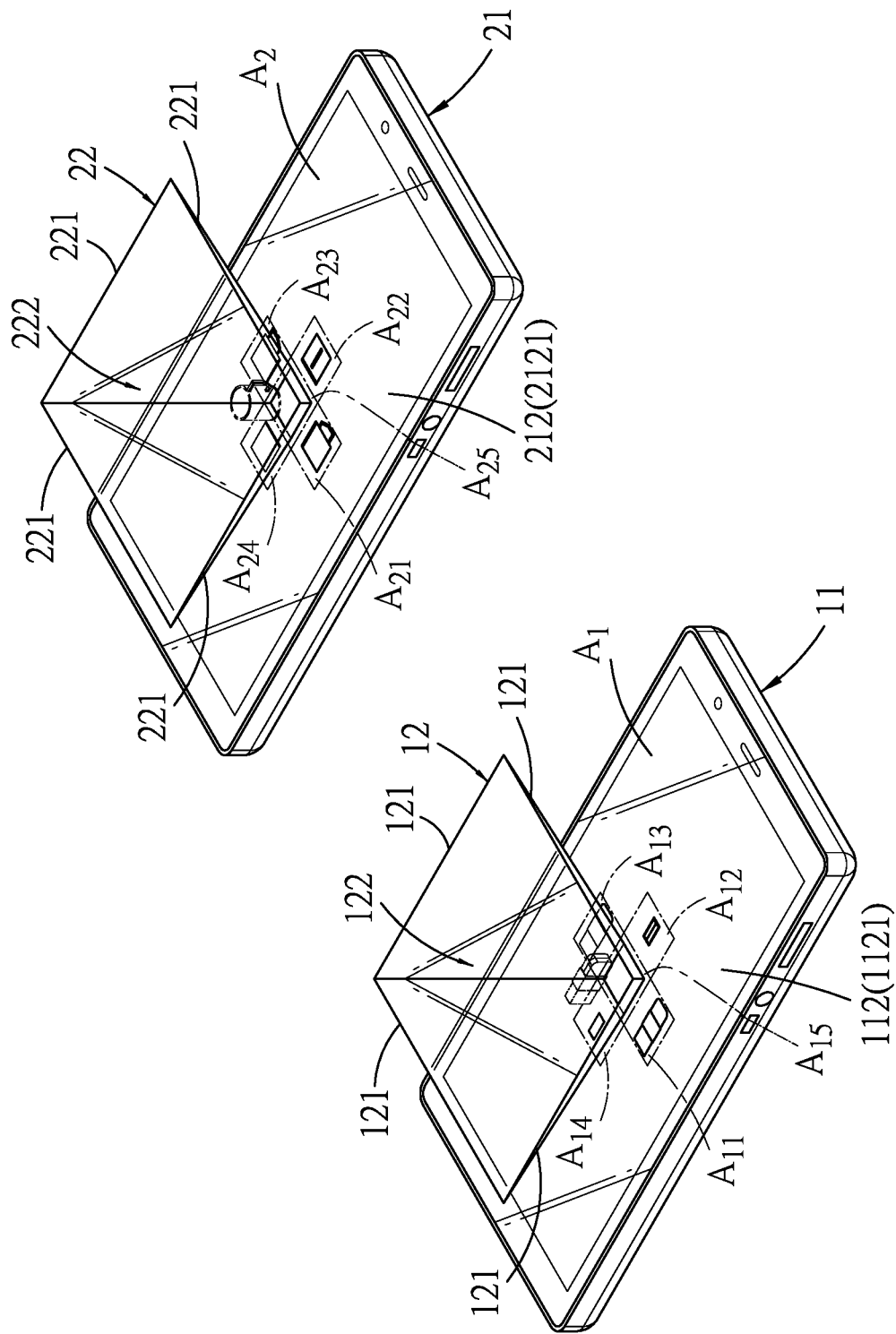
FIG. 19 is a schematic perspective view illustrating the first and second electronic devices cooperating respectively with the first and second imaging frames to respectively form two virtual 3D images of the second and first target objects.

In step S7, upon receipt of the first set of image data ($D_1$), the display unit 212 of the second electronic device 21 stops displaying the second image parts that are related to the virtual 3D image of the second target object, and displays the first image parts respectively on the second display areas ($A_{21}$-$A_{24}$) according to the first set of image data ($D_1$) to reconstruct the virtual 3D image of the first target object, i.e., a cup, in the second inner space 222 of the second imaging frame 22. If this is the first time for the second electronic device 21 to have received the first set of image data ($D_1$), the processor 214 of the second electronic device 21 further sets an initial value of a total score ($S_{t21}$) associated with the first target object (e.g., zero) and stores the total score ($S_{t21}$) in the storage unit 211. The virtual 3D images of the first and second target objects are reconstructed in the second and first inner spaces 222, 122 as depicted in FIG. 19.

Note that the storage units 111, 211 of the respective first and second electronic devices 11, 21 store the second and first sets of image data ($D_2$, $D_1$) respectively therein and store the total scores ($S_{t12}$, $S_{t21}$) corresponding to the second and first target object for the respective users (U1, U2) upon receipt of the second and first sets of image data ($D_2$, $D_1$), respectively. In this embodiment, the initial value of the total scores ($S_{t12}$, $S_{t21}$) are both set as zero. Note that steps S6 and S7 may be performed in parallel and the present disclosure is not limited to this example. By this way, the users (U1, U2) of the first and second electronic devices 11, 21 can interact with each other and learn knowledge related to the second and first target objects which have been watched by the users (U2, U1).

It should be noted that, after the exchange learning mode, each of the first and second electronic devices 11, 21 may implement the learning method in the general learning mode again for acquiring more score for the target object, the virtual 3D image of which is currently displayed by the electronic device 11, 12 cooperating with the imaging frame 21, 22 placed on the display unit 112, 212 of the electronic device 11, 12.

To sum up, the learning system 100 implementing the learning method in the general learning mode is capable of encouraging the users to concentrate on the virtual 3D image of the target object and to learn about the target object. Further, when the learning system implements the learning method in the common learning mode and the exchange learning mode, the users (U1, U2) of the first and second electronic devices 11, 21 can interact with each other, thus increasing fun when learning knowledge related to the same or different target objects.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A learning method to be implemented by a first electronic device cooperating with a first imaging frame, the first electronic device including a processor and a first display unit, the method comprising:
    storing a first set of image data that is related to a virtual three-dimensional (3D) image of a first target object, and a total score that is associated with the first target object;
    displaying, by the first display unit, a plurality of first image parts respectively on a plurality of first display areas that surround a first central area according to the first set of image data, in a manner that the virtual 3D image of the first target object is reconstructed in the first imaging frame when the first imaging frame is placed on the first display unit and corresponds to the first central area in position;
    determining, by the processor, whether a time duration for which the first display unit displays the first image parts for reconstructing the virtual 3D image is not smaller than a predetermined time duration;
    when it is determined that the time duration is not smaller than the predetermined time duration, adding, by the processor, a learning score to the total score;
    controlling, by the processor, the first display unit to output a question related to the first target object;
    upon receiving a user answer, determining, by the processor, whether the user answer is correct; and
    when it is determined that the user answer is correct, adding, by the processor, an answering score to the total score.

2. The learning method as claimed in claim 1, the first display unit being a touch screen display, the first imaging frame being conductive, the method further comprising:
    detecting movement of the first imaging frame, by the first display unit, on a surface of the first display unit; and
    upon detecting movement of the first imaging frame on the surface of the first display unit, adding, by said processor, an additional score to the total score.

3. The learning method as claimed in claim 2, wherein detecting movement of the first imaging frame includes detecting one of translation of the first imaging frame on the surface of the first display unit, and rotation of the first imagining frame around a central axis thereof that is perpendicular to the surface of the first display unit.

4. The learning method as claimed in claim 2, further comprising, upon detecting movement of the first imaging frame on the surface of the first display unit, moving, by the processor, the first display areas and the first central area and the first image parts displayed on said first display unit in accordance with the movement of the first imaging frame, in a manner that the virtual 3D image of the first target object is continuously reconstructed in the first imaging frame.

5. The learning method as claimed in claim 1, the first electronic device communicating with a server that stores the first set of image data, the method to be implemented further by the server, and further comprising:
    sending, by the first electronic device, a request signal to the server to ask for the first set of image data, the request signal including a first device identification (ID) code that is used to identify the first electronic device; and
    in response to receipt of the request signal from the first electronic device, transmitting, by the server, the first set of image data to the first electronic device.

6. The learning method as claimed in claim 5, the server further storing a first data code assigned to the first set of image data, the method further comprising:
    in response to receipt of the request signal from the first electronic device, associating, by the server, the first device ID code received from the first electronic device with the first data code that is assigned to the first set of image data corresponding to the request signal; and
    storing, by the server, association relationship between the first device ID code and the first data code.

7. The learning method as claimed in claim 5, the learning method to be implemented further by a second electronic device cooperating with a second imaging frame, the second electronic device communicating with the server and communicating with the first electronic device over a short-range communication network, the method further comprising:

transmitting, by the server to the second electronic device, a second set of image data that is stored therein and that is related to a virtual 3D image of a second target object in response to receipt of a request signal from the second electronic device to ask for the second set of image data, the request signal from the second electronic device including a second device ID code that is used to identify the second electronic device;

associating, by the server, the second device ID code with a second data code that is assigned to the second set of image data in response to receipt of the request signal from the second electronic device;

displaying, by a second display unit of the second electronic device, a plurality of second image parts respectively on a plurality of second display areas that surround a second central area according to the second set of image data, in a manner that the virtual 3D image of the second target object is reconstructed in the second imaging frame when the second imaging frame is placed on the second display unit and corresponds in position to the second central area of the second display unit;

transmitting, by the first electronic device, an exchange-requesting signal to the second electronic device;

in response to receipt of the exchange-requesting signal, emitting, by the second electronic device a confirm signal and a notification signal that includes the second device ID code respectively to the first electronic device and the server;

in response to receipt of the confirm signal from the second electronic device, emitting, by the first electronic device, a notification signal that includes the first device identification code to the server;

in response to receipt of the notification signals respectively from the first electronic device and the second electronic device, by the server, associating the first device ID code with the second data code, associating the second device ID code with the first data code, and transmitting the first set of image data and the second set of image data respectively to the second electronic device and the first electronic device;

displaying, by the first display unit, the second image parts respectively on the first display areas according to the second set of image data, in a manner that the virtual 3D image of the second target object is reconstructed in the first imaging frame when the first imaging frame is placed on the first display unit and corresponds to the first central area in position; and displaying, by the second display unit, the first image parts respectively on the second display areas according to the first set of image data, in a manner that the virtual 3D image of the first target object is reconstructed in the second imaging frame when the second imaging frame is placed on the second display unit and corresponds to the second central area in position.

8. The learning method as claimed in claim 7, further comprising:

in response to receipt of the notification signals respectively from the first electronic device and the second electronic device, by the server, dissociating the first device ID code from the first data code, and dissociating the second device ID code from the second data code.

9. A learning system comprising:
a first electronic device including
a storage unit that stores a first set of image data related to a virtual three-dimensional (3D) image of a first target object, and a total score associated with the first target object,
a first display unit that is configured to display, according to the first set of image data, a plurality of first image parts respectively on a plurality of first display areas surrounding a first central area, and
a processor that is configured to determine whether a time duration for which the first display unit displays the first image parts is not smaller than a predetermined time duration, and to add a learning score to the total score when determining that the time duration is not smaller than the predetermined time duration; and
a first imaging frame including a plurality of transparent plates that are interconnected to define a first inner space, said first imaging frame having a shape substantially of a frusto-pyramid, and a polygonal end,
wherein, when said first imaging frame is placed on a surface of said first display unit with said polygonal end corresponding to the first central area in position, an included angle between said surface and each of said transparent plates is a substantially identical acute angle, and the virtual 3D image of the first target object is reconstructed in said first inner space by refracting the first image parts through said transparent plates, respectively,
wherein said processor is further configured to control said first display unit to output a question related to the first target object, determine whether a user answer is correct upon receipt of the user answer, and add an answering score to the total score when determining that the user answer is correct.

10. The learning system as claimed in claim 9, wherein said first display unit is a touch screen display, said first imaging frame is conductive, said first display unit being configured to detect movement of said first imaging frame on the surface of the first display unit;
wherein said processor is further configured to add an additional score to the total score upon said first display unit detecting movement of said first imaging frame on said surface of said first display unit.

11. The learning system as claimed in claim 10, wherein said first display unit is configured to detect movement of said first imaging frame on a surface of the first display unit by detecting one of translation of said first imaging frame on the surface of the first display unit, and rotation of said first imagining frame around a central axis thereof that is perpendicular to the surface of said first display unit.

12. The learning system as claimed in claim 10, wherein said processor is configured to move the first display areas and the first central area in accordance with the movement of the first imaging frame upon said first display unit detecting movement of said first imaging frame on the surface of said first display unit, in a manner that the virtual 3D image of the first target object is continuously reconstructed in said first inner space.

13. The learning system as claimed in claim 9, further comprising a server that stores the first set of image data and that communicates with said first electronic device, said first electronic device configured to send a request signal to said server to ask for the first set of image data, the request signal including a first device identification (ID) code that is used to identify the first electronic device, said server configured to transmit the first set of image data to said first electronic device in response to receipt of the request signal therefrom.

14. The learning system as claimed in claim 13, wherein said server further stores a first data code assigned to the first set of image data, and is configured to associate the first device ID code received from said first electronic device with the first data code that is assigned to the first set of image data corresponding to the request signal in response to receipt of the request signal from the first electronic device, and store association relationship between the first device ID code and the first data code.

15. The learning system as claimed in claim 14, wherein said first electronic device further includes a communication module, the system further comprising:
a second electronic device including a storage unit, a second display unit, a processor, and a communicating module for communicating with said first electronic device over a short-range communication network; and
a second imaging frame including a plurality of transparent plates that are interconnected to define a second inner space, said second imaging frame having a shape substantially of a frusto-pyramid and a polygonal end,
wherein said server further stores a second set of image data related to a virtual 3D image of a second target object and a second data code assigned to the second set of image data and communicates with said second electronic device, said second electronic device configured to send a request signal to said server to ask for the second set of image data, the request signal sent by said second electronic device including a second device ID code that is used to identify said second electronic device, said server further configured to, in response to receipt of the request signal from said second electronic device, transmit the second set of image data to said second electronic device, and configured to associate the second device ID code received from said second electronic device with the second data code and store association relationship between the second device ID code and the second data code;
wherein said storage unit of said second electronic device is configured to store the second set of image data upon receipt of the second set of image data from said server, said second display unit configured to display, according to the second set of image data, a plurality of second image parts respectively on a plurality of second display areas surrounding a second central area, when said second imaging frame is placed on a surface of said second display unit with said polygonal end corresponding to the second central area in position, an included angle between said surface and each of said transparent plates of said second imaging frame is a substantially identical acute angle, and a virtual 3D image of the second target object is reconstructed in said second inner space defined by said transparent plates by refracting the second image parts through said transparent plates respectively;
said first electronic device further configured to transmit an exchange-requesting signal to said second electronic device;
said second electronic device configured to emit a confirm signal and a notification signal that includes the second device ID code respectively to the first electronic device and the server in response to receipt of the exchange-requesting signal;
said first electronic device configured to emit a notification signal that includes the first device identification code to said server in response to receipt of the confirm signal from said second electronic device;
said server configured to, in response to receipt of the notification signals respectively from said first electronic device and said second electronic device, associate the first device ID code with the second data code, associate the second device ID code with the first data code, and transmit the first set of image data and the second set of image data respectively to said second electronic device and said first electronic device;
said first display unit configured to display the second image parts respectively on the first display areas according to the second set of image data, in a manner that the virtual 3D image of the second target object is reconstructed in the first imaging frame when said first imaging frame is placed on said surface of said first display unit with said polygonal end thereof corresponding to the first central area in position; and
said second display unit configured to display the first image parts respectively on the second display areas according to the first set of image data, in a manner that the virtual 3D image of the first target object is reconstructed in the second imaging frame when said second imaging frame is placed on said surface of said second display unit with said polygonal thereof corresponding to the second central area in position.

16. The learning system as claimed in claim 15, wherein said server is further configured to, in response to receipt of the notification signals respectively from said first electronic device and said second electronic device, dissociate the first device ID code from the first data code, and dissociate the second device ID code from the second data code.

* * * * *